United States Patent Office 3,540,840
Patented Nov. 17, 1970

3,540,840
RECOVERY OF TIN FROM TIN-BEARING SOLUTIONS
David C. Johnson, St. Paul, and Stanley L. Gordon, Minneapolis, Minn., assignors to General Mills, Inc., a corporation of Delaware
No Drawing. Filed Dec. 19, 1967, Ser. No. 691,688
Int. Cl. C01g 19/00
U.S. Cl. 23—53                      10 Claims

ABSTRACT OF THE DISCLOSURE

An improved process for the recovery of tin existing as ionic or free tin in a tin-bearing solution wherein the tin-bearing solution is treated with a stoichiometric amount, based on tin content and acid value of the solution if any, and preferably an excess thereof, of an aqueous alkali metal hydroxide solution the improvement which is the subsequent recovery of tin by precipitating the tin as an alkali metal stannate.

---

This invention relates to a method of recovering tin and tin catalysts from systems, particularly organic systems such as those encountered in the production of α-tocopherols.

The problem of recovery of tin used as a catalyst in organic synthesis reactions has been a troublesome one. Many processes have been suggested and tried, each found wanting in various aspects. A specific example is the process of incineration of waste streams which results in great losses of tin. It has also been suggested to precipitate tin as a tin oxide, but the tin oxide is often occluded and contaminated with organic impurities. In addition, various methods of processing the tin by smelting have resulted in odious, noxious, and corrosive combustion products.

This invention in its broader aspects relates to a tin recovery process wherein the tin present in the tin-bearing solution is in an ionic or free tin state and is converted to an aqueous soluble form by treatment with alkali metal hydroxide solutions followed by the removal of any organic contaminates, and recovery of the tin as an alkali metal stannate by the addition of a concentrated alkali metal hydroxide.

An example of a suitable organic waste stream containing ionic or free tin, i.e. tin which is not organically bound, is that which occurs in the methylation of tocopherols such as is disclosed in U.S. 2,486,542. Generally, in such a process the reaction mixture is treated with an organic solvent and separates into a two-phase system. The upper, solvent layer contains all tocopherol values and the lower organic phase is a waste layer. The latter contains acetone, water, formaldehyde and its derivatives, excess hydrochloric acid, tin and/or tin chlorides, and various condensation products, etc. The process as disclosed herein is primarily concerned with the recovery of the tin from such a waste stream. However, the process of recovering tin as disclosed herein is not limited to the above specific organic waste stream as this process may also be used with inorganic streams as well as other organic streams.

This invention, therefore, primarily comprises converting tin ions in an aqueous organic medium to the soluble metal tin salt by treatment with an alkali metal hydroxide solution and then precipitating the tin as an alkali metal stannate by the addition of a concentrated alkali metal hydroxide.

Generally, until now, it was essential that all tin be present as either the stannic ion or as free tin. Furthermore, it was necessary to introduce a salt, i.e., $CaCl_2$, to precipitate the available tin as calcium stannate. Any tin present in the stannite form was lost in the filtrate.

An improvement to this basic process has now been found wherein, all available tin, after treatment with the alkali metal hydroxide solution is precipitated as an alkali metal stannate by the addition of concentrated alkali metal hydroxide to the tin-bearing solution. Any stannous ion present as a stannite is converted to a stannate in concentrated alkali metal hydroxide since the stannite is not stable under such conditions. Therefore, it is no longer necessary to add a third component to the reaction, e.g., calcium chloride, nor is it necessary to convert all of the stannous ion to stannic ion prior to treatment with the alkali metal hydroxide solution.

All solution strengths as disclosed herein refer to a weight basis unless otherwise so indicated. When stoichiometric amounts are referred to herein it is in reference to the tin present in the system. In addition, when referring to stoichiometric amounts of an alkali metal hydroxide, the amount is in reference to the tin present as well as the amount required to neutralize the solution if the tin-bearing solution is acidic.

When practicing this invention, the amount of alkali metal hydroxide solution to be employed is determined from the acid value and the tin content of the waste stream. To determine the acid value, a conventional acid value determination is made by titrating a 50 gram sample of the waste stream to a pH 7.0 with a standardized alkali solution, e.g. potassium hydroxide solution. The number of milligrams of potassium hydroxide per gram of sample required for neutralization is the acid value. Tin content can be determined by any number of conventional methods, e.g. wet analysis, spectroscopy, etc.

When practicing an embodiment of this invention, an organic waste stream containing ionic or free tin of known tin content and acid value is weighed into a reaction vessel. A stoichiometric amount of an alkali metal hydroxide solution needed to neutralize the acid and to react to form a soluble alkali metal stannate with the available tin is added to the reaction vessel. Preferably the alkali metal hydroxide is sodium hydroxide as a solution of greater than 10% and less than 50% in concentration, preferably 15–30%. To insure the best possible recovery, it is preferable to keep the temperature of the exothermic reaction to less than 50° C. since at a temperature above 50° C., volatile organics boil off and poor separation occurs. It is desirable to continue mixing after complete addition of the sodium hydroxide so that all of the sodium hydroxide solution is reacted. At the completion of this step, the mixture readily stratifies into a clear aqueous layer and an organic upper phase. The lower aqueous layer is strongly alkaline and has an observed pH in excess of 12, generally 13.1–13.3. The organic tin free upper phase may be discarded or treated to recover the organic solvent, if desired, and the tin present in the lower aqueous phase can be precipitated to give a recoverable tin product.

Strong alkali metal hydroxide solutions must be used to get a stratification of the organic and aqueous phases, and conversion of the available tin to a stannate or stannite depending upon the presence of the stannic or stannous ion. Suitable alkali metal hydroxide solutions include solutions of lithium hydroxide, potassium hydroxide, and sodium hydroxide. It has been found that a solution of 10% concentration of the alkali metal hydroxide produces unsatisfactory results since poor stratification of the organics will occur. Likewise, a concentration of 50% or more produces spontaneous rapid heating to boiling accompanied by lumpy solids. Therefore, it is desirable to keep within the range of solution concentrations greater than 10% and less than 50% alkali metal hydroxide. Most satisfactory results were obtained when using a solution of 15–30% concentration of the alkali metal hydroxide. It is also desirable to use a slight excess of the alkali, up to 20% excess over the stoichiometric amount, to insure that all acid is neutralized.

After all of the alkali metal hydroxide solution has been added to the tin-bearing solution, essentially all of the available tine is present as soluble alkali metal stannate and/or alkali metal stannite. The second step, the unique feature of the process, involves precipitating the product from the aqueous tin rich portion as an alkali metal stannate. This is accomplished by adding a solid alkali metal hydroxide, e.g., pellets or flakes, to the separated aqueous layer. Any sodium stannite present is unstable in concentrated alkali hydroxides and is decomposed to the corresponding alkali metal stannate. The solid alkali metal hydroxide is preferably added over a period of time such that the mixture does not boil. If boiling occurs the slurry might become more viscous and more difficult to separate. Therefore it is desirable to keep the temperature of the mixture below 50° C. The mixture is preferably stirred or agitated slowly during the addition of the solid alkali metal hydroxide. This will insure complete solution of the flakes and will not break the solids into finer particles which might also be more difficult to separate.

Generally, the more solid alkali hydroxide added to the tin rich phase the greater the recovery of the tin. For example, if the normality of the aqueous tin rich phase is raised from 4 to 7 by the addition of the solid alkali hydroxide, the recovery of the tin will vary from 80 to 96%. From an economic point of view, the lower normalities, e.g. 4–5, may be preferred to the higher normalities, e.g. 7.0.

After treatment with the solid alkali metal hydroxide, the precipitated products comprised of alkali metal stannate and the alkali chloride may be recovered by conventional means, i.e., filtration, centrifuging, etc. Due to the alkaline nature of the tin-bearing solution after treatment with the solid alkali hydroxide it has been found that a fiber glass filter media was the most satisfactory.

Since the alkali metal hydroxide content of the filtrate is quite high, i.e., 15% or greater, this solution may desirably be recycled for use in the first step of the process wherein the ionic or free tin is converted to an aqueous soluble alkali metal stannate and/or stannite by treatment with alkali metal hydroxide solution.

Suitable solid alkali metal hydroxides include sodium hydroxide, potassium hydroxide, or lithium hydroxide. It is preferred that the solid form of these hydroxides be pellets or flakes. A sufficient amount of these pellets or flakes is added to the tin-bearing solution so as to convert all of the available tin to the alkali metal stannate and to raise the normality of the tin-bearing solution to 4.0–7.0 depending upon the degree of recovery of the tin desired.

Although it is preferable to add solid alkali metal hydroxide to precipitate the alkali metal stannate, it is possible to add concentrated solutions, e.g. in excess of 50% alkali metal hydroxide to precipitate the tin and raise the normality of the tin-bearing solutions to 4–7 after treatment with the weaker, e.g. 10–50% aqueous alkali hydroxide solutions. At the present time, commercially available concentrated solutions exist as 50 or 70% alkali metal hydroxide. However, this requires more alkali metal hydroxide since more water is introduced into the system. Likewise, it may be possible to remove water by evaporation after treatment with the aqueous alkali metal hydroxide solution and thus raise the normality of the tin-bearing solution and precipitating the alkali metal stannate.

As indicated previously, the tin recovery need not necessarily be restricted to organic streams. Aqueous mixtures containing tin in the ionic or free tin state can be treated with an alkali metal hydroxide solution as indicated above to form a soluble alkali metal stannate and/or stannite and then further processed as disclosed herein.

The following examples will further illustrate but are not intended to limit the scope of this invention.

EXAMPLE I

The organic waste stream from the methylation of tocopherols as disclosed in U.S. 2,486,542 and containing acetone, acetone condensation products, water, excess hydrochloric acid, formaldehyde and its derivatives, tin, and other organic compounds was analyzed for tin content and acid value. The waste stream was found to contain 9.3% tin and had an acid value of 225.0 mg. KOH per gram of sample. A 1000 gram sample of this organic stream was placed in a 2000 milliliter, 3-necked flask and cooled to approximately 10° C. The reaction flask was equipped with a stirrer and a thermometer. The stoichiometric amount and 3.5% excess of a 30% sodium hydroxide solution (770 grams of solution containing 231 grams of sodium hydroxide), was added to the reaction vessel at such a rate so as to keep the temperature below 45° C. Agitation was continued for a short time after addition of the sodium hydroxide solution. Approximately 10 minutes after the agitation was stopped, the mixture stratified into an upper organic phase and a lower tin rich aqueous phase, the latter containing substantially all of the tin in the original stream. The aqueous portion of the mixture was separated from the organic phase by decantation and the organic phase was discarded. The aqueous portion was determined to weigh 1203 grams and was divided into 6 approximately equal portions. Solid sodium hydroxide pellets which contained 97% sodium hydroxide were added to each of the six samples until the normality of the aqueous solution attained the various values indicated below. The addition of the solid sodium hydroxide precipitated the tin as a sodium stannate which was then recovered by vacuum filtration. The filtrate, a clear alkaline solution, was analyzed for tin content. A summary of the tin recovery is given in the table below.

TABLE I

| Sample No. | (1) Wt. aqueous layer, g. | (2) Tin content (calc'd), g. | (3) Wt. 97% NaOH pellets Added, g. | (4) Normality after pellet addition | (5) Amount of filtrate, g. | (6) Tin in filtrate, g. | (7) Amount of tin recovered (calc'd.), g. | (8) Percent tin recovered (7)÷(2) |
|---|---|---|---|---|---|---|---|---|
| 1 | 193 | 14.96 | 38.8 | 6.65 | 99.0 | 0.38 | 14.58 | 97.45 |
| 2 | 200 | 15.50 | 34.1 | 5.65 | 104.0 | 0.76 | 14.74 | 95.12 |
| 3 | 200 | 15.50 | 27.8 | 4.65 | 137.0 | 1.36 | 14.14 | 91.20 |
| 4 | 200 | 15.50 | 40.2 | 6.65 | 118.0 | 0.57 | 14.93 | 96.32 |
| 5 | 200 | 15.50 | 34.1 | 5.65 | 135.0 | 0.82 | 14.68 | 94.71 |
| 6 | 200 | 15.50 | 27.8 | 4.65 | 129.0 | 0.94 | 14.56 | 93.94 |

EXAMPLE II

Example I was repeated except that tin content was 8.7% and the acid value was 225 mg. KOH per gram of sample. Aqueous alkali metal hydroxide solution was added to the 1000 gram sample as in Example I followed by phase separation. Solid sodium hydroxide pellets were added to the tin rich phase and the resulting precipitate containing sodium stannate was filtered as in Example I. The filtrate from the filtration of the precipitated sodium stannate was used as a recycle solution for the 30% aqueous sodium hydroxide solution used to convert the tin present in the tin-bearing stream to a soluble sodium tin salt. Sufficient solid sodium hydroxide pellets were added to the recycle stream to give 770 grams of a 30% sodium hydroxide stream. The use of this filtrate in step 1 of this process was repeated twice before discarding the filtrate. The normality of the solution for precipitation of the sodium stannate was 7 N. The tin recovery results with filtrate recycle are summarized below in Table II.

TABLE II

| Cycle | Waste liquor charge, g. | Wt. 30% NaOH added, g. | Wt. 97% NaOH pellets added | Wt. wet cake | Percent tin | Percent recovery (calc'd) | Wt. filtrate recycled | Wt. pellets added to recycled filtrate |
|---|---|---|---|---|---|---|---|---|
| 1 | 1,000 | [1] 770 | 254 | 410 | 19.6 | 92.37 | 708 | 62 |
| 2 | 1,000 | [2] 770 | 267 | 700 | 12.9 | 96.43 | 704 | 66 |
| 3 | 1,000 | [2] 770 | 280 | 661 | 13.0 | 95.12 | | |

[1] Fresh.
[2] Recycled.

When treating the organic stream with the aqueous alkali metal hydroxide solution, a 30% solution was used. However, satisfactory results were obtained using a 15 and 20% solution. A 30% solution is preferred because of volume limitations of the equipment.

Similar results can be obtained by replacing the sodium hydroxide with either lithium hydroxide or potassium hydroxide.

The process of this invention provides a simple method of obtaining a tin product which can be processed by conventional processing techniques without the presence of odious, noxious, and corrosive combustion products. A further advantage is the fact that the oxidation state of the tin need not be all stannic or stannous ion prior to treatment with the alkali metal hydroxide solution. Furthermore, only one reagent is required although it is used in two forms; a solution form and a solid form. Furthermore, the product is easily filtered or centrifuged with no need for pH adjustment. The resulting tin precipitate of this process is relatively free of organic impurities, a significant factor in conventional smelting techniques. Other advantages and embodiments will be readily apparent to those of ordinary skill in the art.

The embodiments of this invention in which an exclusive property or privilege is claimed are defined as follows:

1. In a process for the recovery of tin from ionic or free tin bearing solutions resulting from treatment with at least a stoichiometric amount of an aqueous solution of an alkali metal hydroxide required to form a soluble alkali metal stannate or stannite with the available tin, said aqueous solution of an alkali metal hydroxide having an alkali metal hydroxide concentration of greater than 10% and less than 50%, the improvement which comprises treatment of the aqueous alkali metal hydroxide treated stannate solution with a concentrated alkali metal hydroxide having a concentration of greater than 50%, thereby precipitating the available tin as an alkali metal stannate.

2. The process of claim 1 wherein the concentrated alkali metal hydroxide is selected from the group consisting of sodium hydroxide, lithium hydroxide or potassium hydroxide.

3. The process of claim 1 wherein the concentrated alkali metal hydroxide is solid alkali metal hydroxide.

4. The process of claim 1 wherein the concentrated alkali metal hydroxide is in pellet form.

5. The process of claim 1 wherein the concentrated alkali metal hydroxide is in flake form.

6. The process of claim 1 wherein the normality of the tin-bearing solution is 4.0 to 7.0 after treatment with the concentrated alkali metal hydroxide.

7. The process of claim 1 wherein the precipitated alkali metal stannate is recovered by filtration.

8. The process of claim 7 wherein the filtrate is recycled as the aqueous solution of the alkali metal hydroxide thereby using said filtrate for treatment of the tin-bearing solution to form the alkali metal stannate.

9. The process of claim 1 wherein the aqueous alkali metal hydroxide solution has a concentration of 15–30%.

10. The process of claim 1 wherein the aqueous alkali metal hydroxide solution is added in an amount of 20% in excess of the stoichiometric amount.

References Cited

UNITED STATES PATENTS 2,436,974   3/1948   Richter _____ 23—53

HERBERT T. CARTER, Primary Examiner